Aug. 9, 1960          H. O. WAAG          2,948,651

PLASTIC ARTICLE AND METHOD OF PRODUCING SAME

Filed Feb. 24, 1956

INVENTOR.
Harry O. Waag
BY John T. Martin
HIS ATTORNEY

United States Patent Office 2,948,651
Patented Aug. 9, 1960

2,948,651

PLASTIC ARTICLE AND METHOD OF PRODUCING SAME

Harry O. Waag, Dayton, Ohio, assignor to General Motors Corporation, Detroit, Mich., a corporation of Delaware Filed Feb. 24, 1956, Ser. No. 567,548

2 Claims. (Cl. 154—110)

This invention relates to laminated articles and more particularly to laminated articles composed of a plurality of layers of synthetic resin or the like.

In the manufacture of cushions, automobile crash pads and the like, a suitably resilient or impact absorbing mass of material may be formed from, for example, a foamable mixture of polyisocyanate and a polyester, and molded to a desired shape. Desirably a decorative and protective layer of material such as a vinyl resin is attached to the mass on one or more sides thereof as an outer layer.

One method of forming an article of the type described involves coating portions of a mold cavity with a vinyl plastisol which corresponds to the portion of the foamed mass which it is desired to cover with a vinyl layer, heating the mold to cause the vinyl resin to fuse into a self-sustaining layer and thereafter pouring the foamable mixture into the mold cavity over the vinyl layer. The basic shortcoming of an article made in this manner is that the foamed material does not adhere adequately to the vinyl layer. Further to secure a desired flexibility of the surface of the resilient article, it is necessary that the vinyl layer be relatively thin which results in a relatively transparent layer through which the pores of the foamed mass may be seen to present a somewhat unsightly appearance.

It is accordingly an object of this invention to provide a method for effectively securing together separate layers of resin material.

It is another object of this invention to provide a laminated article composed of segmentally formed resin layers which has a layer of relatively short fibers or flock interposed between the resin layers under conditions wherein portions of the flock particles are imbedded in an adjacent side of each of the resin layers.

A further object of this invention is to provide a resilient or impact absorbing article which includes a mass of foamed impact absorbing resin material having a relatively thin flexible synthetic resin outer layer over at least a portion thereof and which further has a layer of relatively short fibers or flock interposed between the foamed mass and the coating layer so that portions of the individual flock particles are imbedded in with the outer layer and the foamed mass whereby the outer layer and foamed mass are effectively secured together and the outer layer is relatively soft and resilient to the touch and presents an attractive appearance.

Another object of the invention is to provide a resilient or impact absorbing article which comprises a foamed isocyanate-modified polyester mass having an outer vinyl layer covering portion and which includes a fibrous flock layer interposed between the vinyl and polyester layers, the flock layer being partially imbedded in the vinyl layer and the polyester layer being foamed and molded against the flock layer.

Further objects and advantages of the present invention will be apparent from the following description, reference being had to the accompanying drawings wherein a preferred embodiment of the present invention is clearly shown.

To illustrate the present invention a resilient or impact absorbing article such as a crash pad for use in automobiles and the like is preferably made of a foamed isocyanate-modified polyester mass molded in suitable dimensions to which is secured a suitable vinyl resin outer layer to provide the article with an attractive appearance when installed and a surface which is resistant to moisture, dirt and the like and further which has a high degree of flexibility and is pleasing to the touch.

Figure 1:
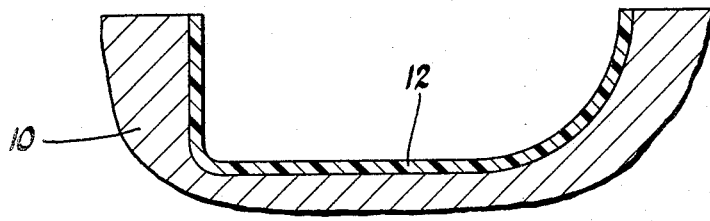
Figure 1 is a mold member having the cavity thereof coated with a vinyl plastisol.

In carrying out the invention a mold is provided as shown in Figure 1 which is designated by numeral 10 and which may have a cavity of any suitable shape or contour in accordance with the desired shape of the crash pad or article to be molded. The surface of the mold cavity is first coated with a layer 12 of suitable resin of suitable thickness such as a vinyl plastisol. By the term vinyl plastisol is meant a vinyl resin such as a vinyl chloride polymer which has been mixed with a suitable plasticizer such as di-2-ethyl hexylphthalate to form a slurry or dispersion, and which when heated to a fusion point forms a solution and then sets to form a film when cooled.

A suitable vinyl plastisol is illustrated by the following example:

| | Parts |
|---|---|
| Polyvinyl chloride (dispersion grade) | 100 |
| Di-2-ethylhexylphthalate (plasticizer) | 90 |
| Barium and cadmium salt complex (heat and light stabilizer) | 3 |
| Calcium carbonate (filler) | 10 |
| Mineral oil (internal lubricant) | 2 |

Other vinyl polymers may be used to form plastisols, as for example, polyvinyl acetate, polyvinyl alcohol and chloro-sulfonated polyethylene and various vinyl copolymers such as a copolymer of vinyl chloride and vinylidene chloride, as are well known in the art. Various plasticizers such as oxidized soybean oil and diethylene glycol may be used and various other ingredients may be added to form films having desirable characteristics as is well known in the art.

Figure 2:
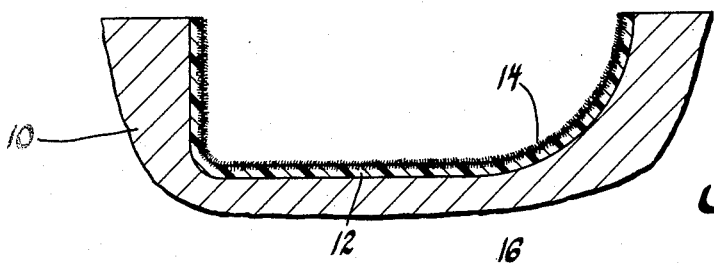
Figure 2 shows a flock layer spread over the vinyl plastisol coating of Figure 1.

After coating the mold surface with the plastisol layer 12, a layer 14 of a flock is sprayed or otherwise applied over the plastisol layer as shown in Figure 2. The flock is preferably in the form of very short fibers which become partially imbedded in the plastisol layer as a consequence of the spraying process. Thereafter the mold is heated by any suitable means so as to heat the plastisol to a fusion temperature, for example, about 375° F. in the case of the polyvinyl chloride recipe set out above.

After the vinyl coating fuses to form a solution the mold is cooled whereupon the vinyl coating sets to form a film having the flock particles firmly imbedded therein.

Figure 3:
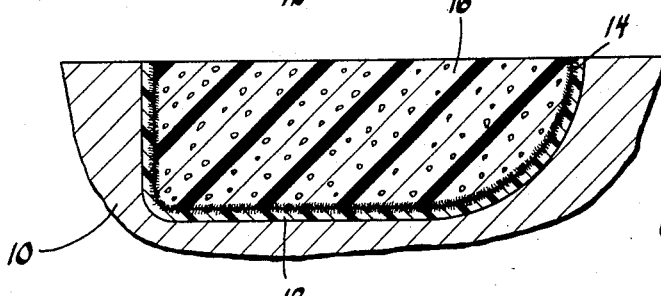
Figure 3 shows an isocyanate-modified resin foamed and molded over the flock layer of Figure 2.

Finally as shown in Figure 3 a foamed polyisocynate-modified polyester mass 16 is molded over the flock layer whereby the polyester firmly adheres to the flock layer. To this end the flock is preferably formed of fibers or material having hydrogen reactive groups such as cotton and rayon having hydroxyl groups whereby free isocyanate groups of the isocyanate-modified polyester may react with the hydrogen reactive groups of the flock to form a firm chemical bond therebetween. However other fibers such as Fiberglas may be used to which the isocyanate-modified polyester will adhere firmly in the curing process thereof.

A suitable semi-rigid isocyanate-modified polyester suitable for the embodiment described above may be formed and molded by mixing 100 parts of the following ingredients which are mixed at 77 to 95° F. and are allowed to exotherm and cook for about an hour at about 200° F.

| | Parts |
|---|---|
| Castor oil | 42.5 |
| Ethylene glycol | 7.5 |
| Toluene diisocyanate | 50.0 | and 7.2 parts of the following catalyst ingredients:

| | Parts |
|---|---|
| Diethanolamine | 42 |
| 37% hydrochloric acid | 24 |
| Water | 40 |

A denser isocyanate-modified polyester may be foamed and molded by raising the castor oil content to 55.71 parts, lowering the ethylene glycol to 5.64 parts and lowering the toluene diisocyanate content to 38.65 parts. Various foamable mixtures may be formulated using alkyd resins having certain hydroxyl and acid numbers and various polyisocyanates and catalysts with or without the presence of water to suit a specific application as is well known in the art. The specific formulation of the vinyl compounds and the isocyanate-modified polyester foamable mixtures disclosed herein form no part of the present invention.

Figure 5:
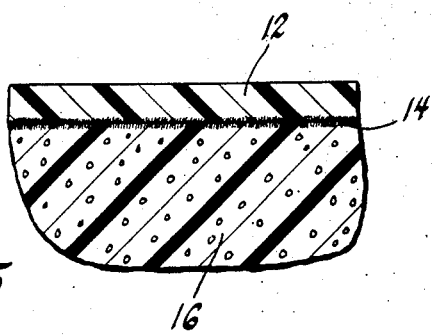
Figure 5 is an enlarged view taken along lines 5—5 of Figure 4 showing the laminated structure of the present invention in somewhat exaggerated detail.

As shown in Figure 5, the structure of an article made in accordance with the present invention has the ends or portions of individual fiber members of the flock layer 14 imbedded in the outer resin layer 12 whereby the flock layer is securely attached to the resin layer 12. In the molding of the polyisocyanate-modified resin foam layer 16 against the flock layer 14, extremity portions of the flock layer are also imbedded in the foam layer which together with the natural adhesiveness of the polyisocyanate-modified material results in a firm bond between the flock layer 14 and the foam layer 16. Thus it may readily be seen that the two resin layers 12 and 16 are firmly held together coextensively with respect to each other by means of the intermediate flock layer 14.

The thickness of the flock layer may be varied so as to produce a desired final effect on the appearance and texture of the outer vinyl layer. However it is essential that the flock layer be sufficiently thin so as to cause sufficient individual fibers to be attached to each of the resin layers whereby an effective bond therebetween is obtained.

Figure 4:
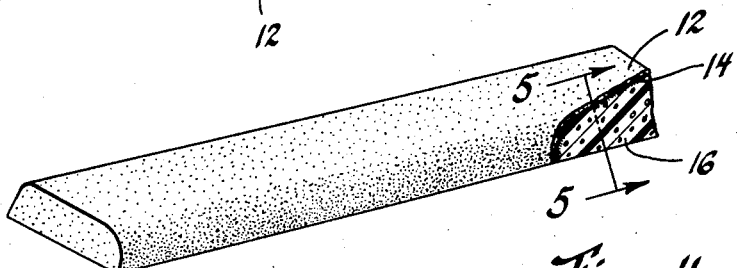
Figure 4 is an impact absorbing article made in accordance with the present invention having a portion thereof broken away.

As applied to the manufacture of articles such as automobile crash pads as shown in Figure 4, the present invention affords several advantages besides providing much improved adhesion between the foamed mass and the vinyl layer. In molding the foam mass direct to the vinyl layer a mirror effect may be obtained due to the large pore structure directly beneath the vinyl layer which may be seen through a thin vinyl coating. The use of the flock inner layer described above smooths out the surface of the foamed mass sufficiently to present an attractive appearing top coating. The flock inner layer also permits the use of a thinner vinyl layer without destroying the attractiveness thereof. Finally the flock inner layer provides the vinyl layer with a surface which is mort pleasant to the touch since the vinyl layer assumes a softer, fabric or leatherlike feel.

Although the present invention has been described essentially in terms of a specific embodiment it is apparent that the invention may be utilized in connection with various materials. Thus the layer 12 may be any material which may be applied to a mold surface in a liquid or highly plastic state in which portions of the sprayed flock will become imbedded and which will thereafter set to form a self-sustaining layer. The layer 16 may be formed of any suitable foamable material including the various elastomeric synthetic resins such as butadiene acrylonitrile copolymers and butadiene-styrene copolyers, and natural rubber. In manufacturing various articles of a non-foamed nature appropriate moldable resins may be used in combination with a flock layer as above described.

While the embodiment of the present invention as herein disclosed constitutes a preferred form, it is to be understood that other forms might be adopted.

What is claimed is as follows:

1. In a method of securely bonding a vinyl plastic sheet to a plastic resin foam without the use of any additional adhesives, comprising the steps of applying an uncured plastisol of a vinyl plastic to the bare face of a mold to form a single vinyl sheet free from any additional adhesives, spraying directly onto the entire surface of said adhesive-free uncured sheet a plurality of short fiber particles in a manner to partially embed the individual particles in said sheet, curing said vinyl plastisol to form a self sustaining sheet having said particles firmly attached therein and partially extending therefrom, pouring an uncured pore-forming resin into said mold immediately adjacent said cured sheet to embed the extending portions of said particles therein, curing and expanding said pore-forming resin, and removing the bonded article from the mold.

2. A securely bonded article of a plastic resin foam and a vinyl sheet free of additional adhesives comprising, a single layer of thin, flexible polyvinyl plastic free of additional adhesives, a plurality of short fiber particles covering one surface of said sheet, being partially embedded directly in said sheet and partially extending therefrom, and the extending portions of said particles being embedded in and attached to an adhesive-free, cured plastic foam material, said foam material being immediately adjacent said vinyl sheet to form a composite securely bonded article.

References Cited in the file of this patent

UNITED STATES PATENTS

| 2,382,784 | Emery | Aug. 14, 1945 |
| 2,429,486 | Reinhardt | Oct. 21, 1947 |
| 2,494,848 | Whitelegg | Jan. 17, 1950 |
| 2,629,678 | Thompson et al. | Feb. 24, 1953 |
| 2,688,577 | Fischer | Sept. 7, 1954 |
| 2,714,559 | Sheffield et al. | Aug. 2, 1955 |
| 2,728,702 | Simon et al. | Dec. 27, 1955 |
| 2,744,340 | Gerber | May 8, 1956 |
| 2,753,642 | Sullivan | July 10, 1956 |
| 2,785,440 | Toulmin | Mar. 19, 1957 |
| 2,797,179 | Reynolds et al. | June 25, 1957 |

FOREIGN PATENTS

| 621,867 | Great Britain | Apr. 21, 1949 |
| 711,146 | Great Britain | June 23, 1954 |
| 1,038,540 | France | May 6, 1953 |
| 156,033 | Australia | Apr. 8, 1954 |